April 27, 1926. Re. 16,334

W. L. BLISS

LIGHTING EQUIPMENT AND STARTING ARRANGEMENT FOR GASOLINE ENGINES OR GASOLINE MOTOR CARS

Original Filed June 25, 1910 2 Sheets-Sheet 1

INVENTOR.

William L. Bliss

BY Chester H. Braselton his ATTORNEY

April 27, 1926. Re. 16,334
W. L. BLISS
LIGHTING EQUIPMENT AND STARTING ARRANGEMENT FOR GASOLINE ENGINES OR GASOLINE MOTOR CARS
Original Filed June 25, 1910 2 Sheets-Sheet 2
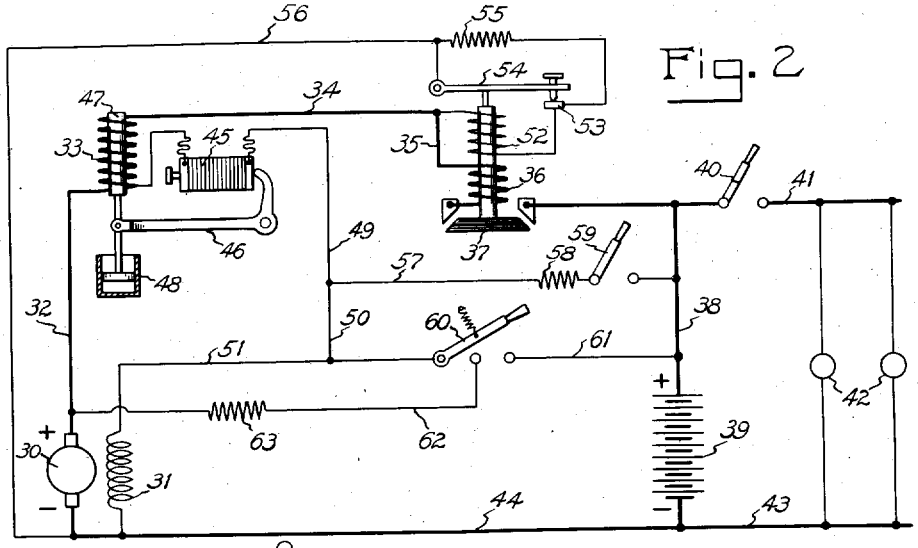
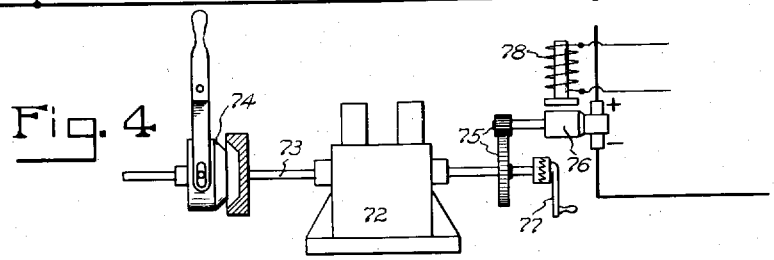
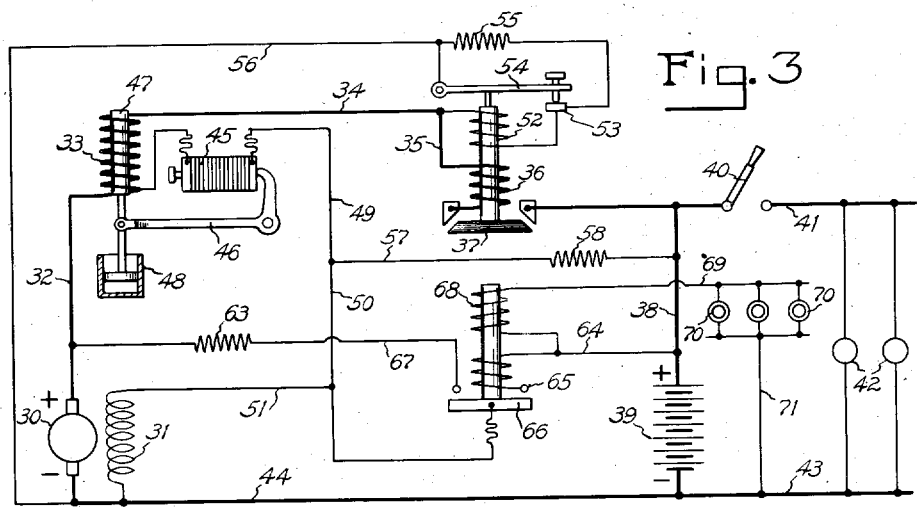
INVENTOR.
William L. Bliss
BY Chester H. Braselton
his ATTORNEY Reissued Apr. 27, 1926.

Re. 16,334

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

LIGHTING EQUIPMENT AND STARTING ARRANGEMENT FOR GASOLINE ENGINES OR GASOLINE MOTOR CARS.

Original No. 1,359,022, dated November 16, 1920, Serial No. 568,909, filed June 25, 1910. Application for reissue filed March 25, 1921. Serial No. 455,590.

*To all whom it may concern:*

Be it known that I, WILLIAM L. BLISS, a citizen of the United States, residing at Niagara Falls, New York, have invented certain new Improvements in Lighting Equipment and Starting Arrangements for Gasoline Engines or Gasoline Motor Cars, of which the following is a specification.

My invention relates to a lighting system adapted particularly to a gasoline automobile or a railway motor car using an internal combustion engine, and also to a starting arrangement for said engine. One of the objects of the invention is to provide a practical and efficient system of electric lighting for a vehicle driven by an internal combustion engine, and another object is to take advantage of the various instrumentalities necessarily incident to a car or vehicle lighting system, to start the engine provided to run the generator which furnishes the current for the vehicle lighting.

In a gasoline automobile or motor car using an internal combustion engine, a clutch is always employed between the engine and the running gear of the car, so that the engine may be started light and afterward, by means of the clutch, connected to the driving mechanism of the car. An electric lighting system may be applied to an automobile in such a manner that a generator may be intermittently driven from the axle of the automobile or from some part of the rotating mechanism. The generator may intermittently charge a storage battery and furnish current to the lamps for lighting the car or automobile. The battery may furnish current for the lamps when the car or engine is at rest or running too slowly to render the generator operative. A regulator may be applied to the generator like those used in railway axle lighting for regulating the generator to confine its output within certain limits, although the generator may be subjected to enormous variations in speed. A regulator for the lamps may be provided to maintain their voltage constant, even though the voltage of the generator and storage battery vary over quite a range.

An automatic switch or its equivalent may be provided to disconnect the generator from the lighting system, to prevent the battery from discharging uselessly through the same. The generator may be driven from a connection on either side of the clutch. If driven from the driving gear on the engine side of the clutch the generator will run whenever the engine runs, notwithstanding the fact that the clutch might be disengaged and the car standing still. By driving the generator from the engine side of the clutch, two important advantages are gained. First, the generator will be in operation more of the time, and hence be usefully employed more of the time than if it were connected on the wheel side of the clutch. Second, by connecting the generator to the engine side of the clutch, the generator may be operated as a motor from the storage battery of the lighting system for starting the engine, no great amount of power being required as the engine would be disconnected from the car wheels at this time and consequently have no load upon it.

The feature of my invention is to provide improved means for utilizing these conditions so that the generator may be started as a motor from the battery, thus starting the engine, which as soon as it begins to operate, will in time drive the motor as the generator of a lighting system.

While the invention is capable of various applications, the ones which I have worked out in practice, and which are illustrated in the accompanying drawings, are a simple, efficient and useful adaptation of the idea as applied to a gasoline automobile or a railway motor car such as are in use on certain railroads for branch line service, and having a system of electric lighting.

In the drawings,

Figure 2 is a diagrammatic representation of a modified system.

Figure 3 is a diagrammatic representation of another modification.

Figure 4 is a diagrammatic representation of a generator and driving means therefor.

Figure 1:
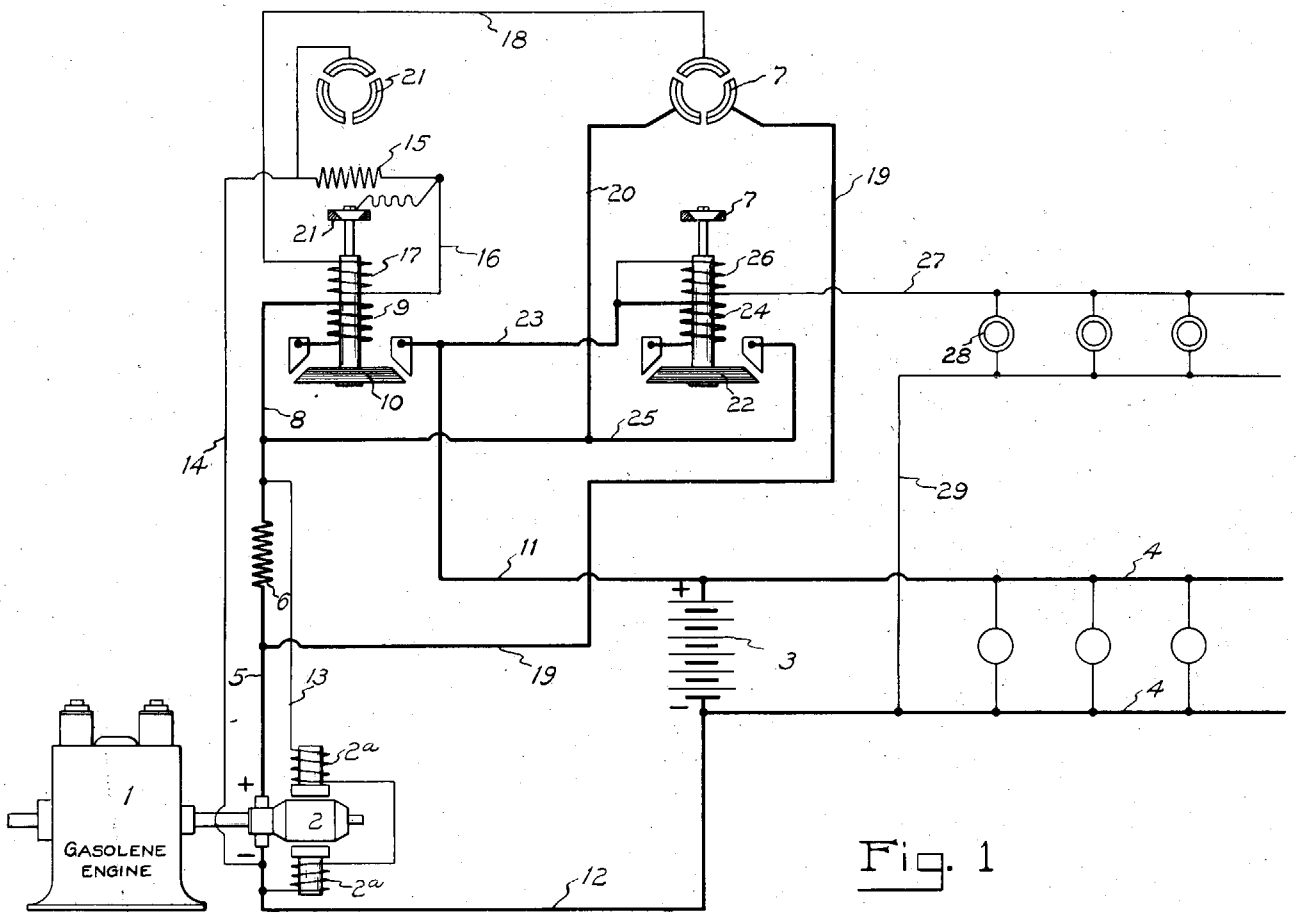
Figure 1 is a diagrammatic representation of a system embodying my invention.

Referring to Figure 1, a gasoline or other hydro-carbon engine 1 is shown connected directly to a shunt wound generator having an armature 2 and shunt field windings $2^a$. The generator supplies the current to the mains with which the storage battery 3 and the lamp circuit 4 are connected in parallel branches.

The gasoline engine is used primarily to drive the car, the mechanical connection through the clutch and gearing to the wheels of the car, not being shown. The capacity of the generator is chosen for the lighting of the car, and in turn, when acting as a motor, is only enough to start the engine.

Two switches connected in parallel branches are aranged between the generator and the storage battery. One of these switches, which I have called the main switch, performs the function of the usual automatic switch in that it is adapted to connect the generator with the storage battery when the voltage of the former is equal to or slightly in excess of that of the latter and also opens the circuit to the storage battery when the generator voltage falls below that of the battery. The second switch, or auxiliary switch, is manually controlled and is used to connect the battery with the generator in order to permit the battery current to flow through the generator in a reverse direction and run the same as a motor to start the engine. When the auxiliary switch is closed by the operator, the main switch is rendered inoperative. The opening of the auxiliary switch, however, restores the main switch to operative condition.

The circuit from the generator to the battery, under working conditions, is completed through conductor 5, around resistance 6, by means of short circuiting contacts 7 controlled by the starting switch, then through conductor 8, releasing coil 9, main switch 10, which is closed at the time and conductor 11. From the battery and lighting circuit 4, the circuit to the generator is completed through conductor 12. The shunt field coils of the generator are connected around resistance 6, by conductor 13, as illustrated.

Suitable means are provided for automatically closing the main switch 10. The means include a lifting coil connected in a circuit across the generator terminals as follows:—from the positive terminal, through conductors 5, 19, triple contact 7, conductor 18, lifting coil 17, conductor 16, resistance 15, and conductor 14, to the negative terminal.

A set of triple contacts 21 is illustrated for use in connection with a system of regulation employing buckers, but as this particular regulation is not essential to the invention, as disclosed in this particular diagram and as any suitable form of regulation may be used in connection therewith, the details of said regulating system have been omitted. It should be noted however, that for the sake of clearness, both vertical and plan views of the contacts of switches 7 and 21 have been provided.

The auxiliary switch 22, which may be called the "motor" starting switch is connected in parallel with the main switch 10 and operates to close a circuit from the battery to the generator, which, under these circumstances will run as a motor. This circuit is from battery 3, conductors 11, and 23, holding coil 24, switch 22 if closed, conductor 25 and dividing, one branch through resistance 6, conductor 5 and generator armature, and the other branch through conductor 13 and generator field $2^a$ to conductor 12 and battery.

For convenience in operating switch 22, a lifting coil 26 is arranged in a circuit leading from the battery, as follows: from battery 3, conductors 11, 23, coil 26, conductor 27, push buttons 28, conductors 29, and back to the battery. The push buttons may be located at convenient places throughout the car, and accordingly the switch may be manually controlled from a distance, if desired, although I do not limit myself to this arrangement.

The operation of the system is as follows:

Upon pressing any of the push buttons 28, the lifting coil 26 is energized by current from the battery 3, and closes the starting switch 22, which is thereafter held in closed position by the coil 24, which coil is included in a circuit from the battery through the generator 2, including also resistance 6, which is intended to prevent damage to the armature and to prevent short circuiting of the battery. As soon as the starting switch 22 has closed, the push button may be released as the coil 24 will hold the switch closed without the assistance of coil 26. The shunt field coil $2^a$ is subject to full battery voltage and hence produces as strong a field for starting as possible. The resistance 6 limits the starting current through the armature, to a suitable value.

The generator now starts as a motor and gives a few turns to the engine corresponding to the ordinary cranking, so that the engine thereafter runs on its own power, whereupon the generator ceases to run as a motor, and no longer draws current from the storage battery. The dying out of this current causes the deenergization of coil 24, switch 22 falling open. The opening of switch 22 closes the triple contact switch 7, which short circuits the resistance 6 formerly in the armature circuit. The object of opening this triple contact switch 7 upon the closing of the starting switch 22, is to prevent, by any possibility, the generator switch 10 closing prematurely. The lifting coil 17 of the automatic switch being open circuited by the triple contact switch 7, said switch is rendered inoperative during the period that the starting switch 22 remains closed.

As the speed of the engine and generator increases, the voltage of the generator increases, the effect of which is to cause less and less current to flow from the battery to the generator, until finally this current becomes zero. The switch 22 opens at this instant or just before, the resistance 6 being short circuited, as it is not needed when the apparatus operates as a lighting system its use when starting the generator as a motor having been explained. The opening of switch 22 also closes the circuit of the lifting coil 17, arranged in a shunt circuit 19, 18, 17, 16, 15, 14, around the generator armature, so that when the generator voltage has reached a value corresponding to the normal voltage of the battery, say two volts per cell, the switch 10 closes and connects the generator to the system so that it can charge the batteries and light the lamps, the circuit being as follows:—from the generator, through conductors 5, 19, switch 7, conductors 20, 8, releasing coil 9, switch 10, conductor 11, storage battery 3 and lighting circuit 4 and conductor 12, back to the generator. Coils 17 and 9 are so wound that they assist each other in holding the switch 10 closed as long as current flows from the generator to the battery. Whenever the generator slows down, however, to a point where its voltage is below that of the battery, the direction of current flow in coil 9 is reversed, owing to the fact that the battery starts to discharge back through the generator, thereby causing releasing coil 9 to oppose lifting coil 17, whereupon the switch 10 falls open.

Under normal conditions, the generator supplies both the battery 3 and the external lighting circuit 4. Whenever the generator is run at less than the proper speed, however, or when it is not running at all, the storage battery alone supplies the lighting circuit. The battery, of course, may also be used for other purposes, such for example, as providing current for the magnetic clutches by means of which the motor car is driven by the engine 1. It may also provide current for the ignition system and for other purposes.

The storage battery provides energy for all of the above purposes provided it is kept charged by the generator. In the case of the gasoline motor car, to which this invention is particularly adapted, a very great advantage obtains over the ordinary car lighting system in that the generator, being connected to the engine and not to the car axle, may be kept running for a much longer time than under the other system. It is customary with gasoline motor cars to keep the generator running practically all the time that the car is on the road. Whenever it is desired to stop the car, it is simply necessary to throw out the clutch and allow the engine to continue running, exactly as is the case with automobiles.

In the foregoing it will be seen that a very simple and efficient system is provided, whereby the engine may be started without resorting to cranking, compressed air devices or other inefficient methods. In order to start, it is simply necessary to push one of the buttons which may be released as soon as the starting switch closes. Thereafter, the system takes care of itself.

Referring to Figure 2 in which is shown a system adapted more particularly for automobile lighting, the generator 30 is shown as having a shunt field 31, the main circuit of said generator being through conductor 32, solenoid 33, conductors 34 and 35, releasing coil 36, main switch 37 and dividing, through branch circuit 38 including a storage battery 39, and through the lighting circuit by way of switch 40, conductor 41, lamp 42 and conductor 43, thence joining the battery circuit through conductor 44 back to the generator.

The shunt field 31 of the generator has in series therewith the carbon pile resistance 45, the pressure on said carbon pile being regulated by one end of a bell crank lever 46, the other end of said lever being moved up and down by plunger 47, having its movement retarded by a dash pot 48. The circuit through the shunt field is from the positive pole of the generator 30, through conductor 32, resistance 45, conductors 49, 50, and 51 to the shunt field 31 and back to the negative pole of the generator.

The closing of the main switch 37 is effected by lifting coil 52, which coil is in a shunt circuit around the terminals of the generator as follows:—from the positive pole of the generator through conductor 32, solenoid 33, conductor 34, lifting coil 52 and dividing at the contact 53, through the lever 54 or through the resistance 55 in a branch circuit around said lever, depending on whether or not the circuit is closed by the said lever at 53 uniting again in conductor 56 and thence to the negative terminal.

A conductor 57, resistance 58 and hand switch 59 are shown as providing a path between the battery circuit 38 and conductors 50 and 51 and the shunt field 31 for the purpose of providing for the proper excitation of the generator field when necessary.

A spring retracted hand switch 60 is provided as a "motor starter". This switch closes a circuit from the battery 39, through conductor 61, switch 60, and dividing through conductor 62, resistance 63, and through armature 30 and conductor 44, joining the other branch circuit from switch 60 through conductor 51 and generator field 31, and thence back to the battery. The resistance 63 is inserted to prevent short circuiting the battery through the armature and injuring the latter, the field being subjected to the full battery voltage, to produce a powerful starting torque, as explained in connection with Figure 1.

The operation of the system is as follows:

Assuming that the engine is not running and that the clutch is thrown out as is customary under these conditions, the generator also will be idle. At this time if it is desired to use the incandescent lights 42, they will be supplied with current by the storage battery 39 upon the closing of switch 40. If it is desired to start the engine, the switch 60 is held closed by hand for a short interval, during which time the generator starts as a motor giving the engine enough turns to start it. After the engine starts, it will drive the motor as a generator and the voltage of the generator will increase. The engine having started, the hand switch is released so that the only circuit from the generator, aside from its field circuit, is that through the lifting coil 52 and lever 54, the resistance 55 being short circuited.

As the speed and consequently the voltage of the generator increases, a predetermined point is reached, at which lifting coil 52 closes the main switch 37 and simultaneously opens the circuit at 53 by the lifting of the lever 54, thus throwing in the high resistance 55. The closing of the main switch occurs when the voltage of the generator exceeds a value corresponding to the normal voltage of the battery, whereupon the generator charges the battery and carries the lamp load. It will be apparent that as soon as the main switch 37 is closed, the series coil 36 assists lifting coil 52 in holding said switch closed. Furthermore, whenever the voltage of the generator falls below that of the battery, due to a lessening of its speed, the battery will discharge back through the holding coil 36 and through the generator, whereupon said coil 36 will oppose coil 52 and the main switch will fall open, at the same time short circuiting resistance 55 by means of lever 54.

The purpose of the carbon pile resistance 45 is to confine the output of the generator within safe limits. This particular type of regulator I have claimed in another application, and inasmuch as it is shown here simply for the purpose of illustrating one of a number of regulators which might be used, a detailed description will be unnecessary. The operation, briefly, is as follows:—

Normally the weight of the plunger 47 keeps it in its lowermost position, thereby producing the maximum pressure on the pile of carbon disks, and reducing their resistance accordingly. Upon excessive rise in the current however, the plunger 47 is lifted under the influence of solenoid 33, whereupon an increased resistance is introduced into the shunt field circuit of the generator, thereby weakening the field and reducing the current. This automatic regulation tends to confine the current within safe limits.

The modification shown in Figure 3 is similar in its main features to that shown in Figure 2, but with the addition of the automatic switch and push buttons for starting the motor from any one of a number of distant points. The same reference characters have been used in this figure as in the preceding figure, where the parts correspond. Starting from the battery 39, the circuit may be traced through conductor 64, solenoid 65, motor starting switch 66 when closed, conductor 67, resistance 63, armature 30, conductor 44 and back to the battery. Another circuit starts with the conductor 64 and branches off through lifting coil 68, conductor 69, push buttons 70, and conductor 71, back to the battery.

The operation of this arrangement is as follows:—

To insure a prompt building up of the generator voltage as the armature begins to rotate, a field energizing circuit from the battery is provided through conductors 38, 57, 50, 51 field winding 31 and conductor 44 back to the battery. A resistance 58 may be provided in this circuit to limit the initial current flowing in the field winding.

Upon pressing any of the push buttons 70 located conveniently in different parts of the automobile, the lifting coil 68 is energized by battery current and closes the starting switch 66, thus completing a circuit from the battery through the generator field and armature and causing said generator to operate as a motor and start the engine in the manner heretofore described. As soon as the switch 66 closes, the coil 65 holds it closed, whereupon the push button may be released, thus deenergizing lifting coil 68. As soon as the engine begins to drive the generator, and the voltage of the generator begins to increase, the E. M. F. of the battery is balanced to a sufficient extent so that the current flowing through coil 65 is so reduced as to cause the motor starting switch 66 to fall open. From this point on, the operation of the system is the same as described in connection with Figure 2.

In Figure 4 there is shown diagrammatically, an internal combustion engine 72 having a shaft 73 provided at one end with any suitable form of clutch 74 and at the other end with gears 75 for driving the generator armature 76. A large gear on the engine shaft and a small one on the generator shaft is very advantageous. It enables the engine to drive the generator at high speed and in turn, gives the generator when starting the engine as a motor, great leverage. The usual crank 77 may also be provided if desired. The generator field winding 78 may be of any suitable form, such as those described above.

The foregoing embodiments of my idea are selected simply as illustrating some of the many practical forms which the invention may assume and it is obvious that various changes may be made without departing from the spirit of the invention, as long as the essential features come within the scope of the appended claims.

Having described my invention, what I claim as new and desire to secure by Letters Patent of the United States, is—

1. In combination, a generator, a storage battery, and a circuit including said elements, means connected to and adapted to drive said generator, but requiring an external starting impulse, said circuit including also two switches in parallel, said switches being normally open, means for closing one of said switches, whereby the battery discharges through said generator to run it as a motor for starting said connected means, means for automatically opening said switch when said generator, driven by said means, develops a predetermined voltage in opposition to said battery voltage, and means for closing the other switch upon still further increase of generator voltage.

2. An automobile starting and lighting system comprising in combination with the automobile engine, a dynamo electric machine connected to said engine, a storage battery in circuit therewith, and means for controlling the circuit between said dynamo electric machine and battery, said means comprising an automatic switch for closing said circuit and an additional means for closing said circuit at will, said additional means acting to prevent the operation of said automatic switch while said circuit is closed by said additional means.

3. An automobile starting and lighting system comprising in combination with the automobile engine, a dynamo electric machine connected to said engine, a storage battery adapted to be connected in circuit therewith, an automatic switch for closing the circuit between said dynamo electric machine and battery, said switch having a lifting coil for closing said switch under predetermined conditions, and a second switch, operable at will, for closing a circuit between said storage battery and dynamo electric machine, said second switch having contacts in the circuit of said lifting coil whereby said lifting coil is rendered inoperative when said second switch is closed.

4. The combination of an engine, an electric machine connected thereto, a secondary battery, an automatic switch for controlling the charge of the battery by the electric machine, and means for cutting out the automatic switch and connecting the battery to the electric machine, whereby the same may be operated as a motor for starting the engine.

5. The combination of an engine, an electric machine connected thereto, a secondary battery, an automatic switch for controlling the charge of the battery by the electric machine, and a second switch for rendering inoperative the automatic switch and connecting the battery to the electric machine, whereby the same may be operated as a motor for starting the engine.

6. In combination, an internal combustion engine, a dynamo electric machine connected to the shaft of said engine, a storage battery to be charged by said dynamo electric machine, means for closing the main circuit from said machine, means for connecting said battery to said dynamo electric machine to start said engine, said means being operable at will, and means for preventing operation of said first mentioned means as long as said second mentioned means is operative.

7. In combination, a dynamo electric machine adapted to be connected to an internal combustion engine, an external circuit for said dynamo electric machine, a storage battery connected across said external circuit, an automatic switch and a second switch connected between said dynamo electric machine and said storage battery in parallel branches, said automatic switch having a lifting coil and a release coil, auxiliary contacts controlled by said second switch, said lifting coil being connected across the generator terminals through said auxiliary contacts, whereby the closing of said second switch renders said automatic switch inoperative and permits battery current to flow to said dynamo electric machine and operate the same as a motor to start the engine.

8. In a lighting system, a dynamo electric machine, a storage battery connected thereto, an automatic switch connected in circuit between said dynamo electric machine and said storage battery, said automatic switch having a lifting coil connected across the terminals of said dynamo electric machine, and a second switch connected in the shunt circuit around said automatic switch and having contacts connected in circuit with said lifting coil, whereby said second switch may be used to short circuit said automatic switch and simultaneously render the same inoperative.

9. The combination of an engine, an electric machine conected thereto, a secondary battery, an automatic switch for controlling the charge of the battery by the electric machine, and a switch for cutting out the automatic switch and conecting the battery to the electric machine, whereby the same may be operated as a motor for starting the engine.

10. The combination of an engine, an electric machine connected thereto, a secondary battery, an automatic switch for controlling the charge of the battery by the electric machine, and a switch for disabling the automatic switch and connecting the battery to the electric machine whereby the same may be operated as a motor for starting the engine.

11. The combination of an engine, an electric machine connected thereto, a secondary battery, an automatic switch for controlling the charge of the battery by the electric machine, said automatic switch having a lifting coil and a holding coil and a switch for open circuiting said lifting coil and connecting the battery to the electric machine, whereby said machine may be operated as a motor for starting the engine.

12. In a device of the character described, the combination with an engine, a motor-generator, and connections between the engine and motor-generator for starting the former by the latter and running the latter by the former; of an accumulator having a plurality of circuit connections with said motor generator, certain of said circuit connections being adapted to transmit high wattage from the accumulator to the motor generator for starting purposes, and other of said circuit connections being adapted to transmit low wattage from the motor generator to the accumulator for charging purposes; and a controlling member having a normal position, for selecting the low wattage circuit connection for charging purposes but movable to a different position to select the high wattage circuit connection for starting purposes; with provisions for automatically restoring said controlling member to normal position.

In testimony whereof, I affix my signature.

WILLIAM L. BLISS.